Dec. 16, 1930.  E. S. HUME  1,785,586
MANUFACTURE OR LINING OF PIPES BY CENTRIFUGAL ACTION
Filed Dec. 27, 1928
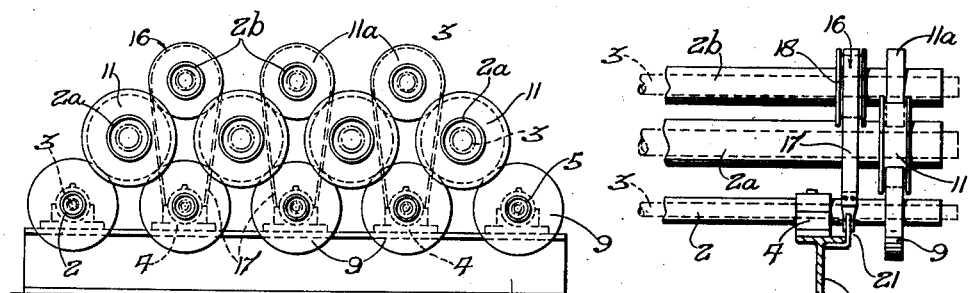
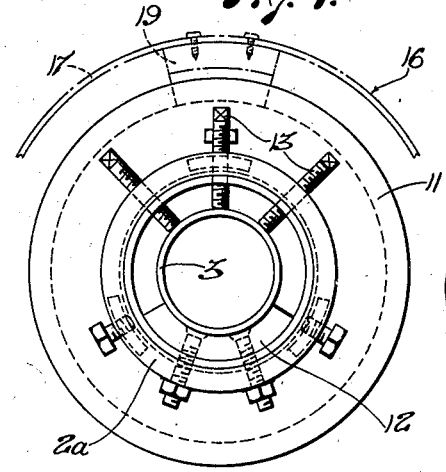
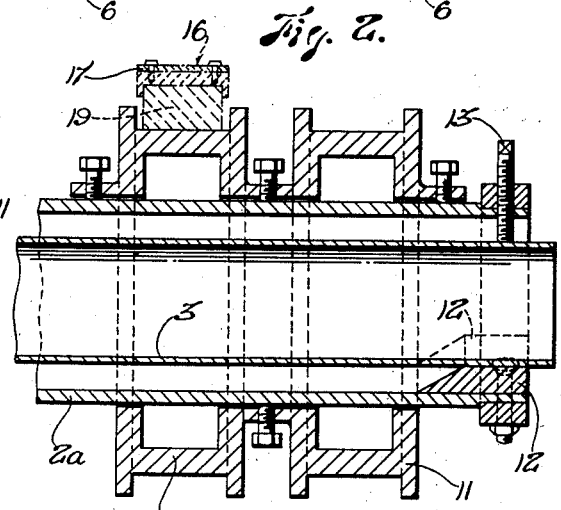
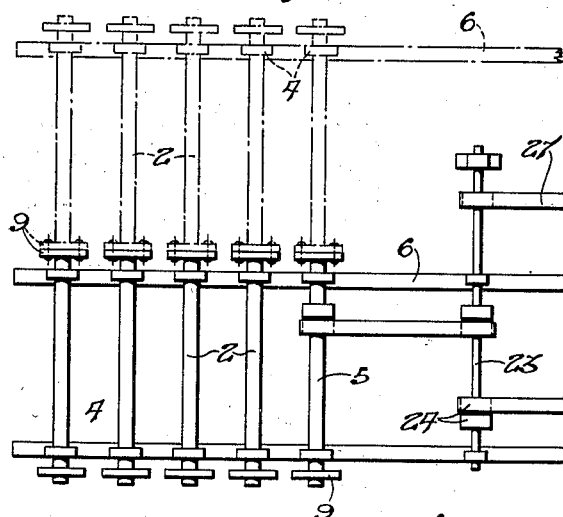
Inventor:
Edward Shotton Hume Patented Dec. 16, 1930

1,785,586

UNITED STATES PATENT OFFICE

EDWARD SHOTTON HUME, OF PERTH, WESTERN AUSTRALIA, AUSTRALIA, ASSIGNOR TO HUME STEEL LIMITED, OF MELBOURNE, AUSTRALIA

MANUFACTURE OR LINING OF PIPES BY CENTRIFUGAL ACTION

Application filed December 27, 1928, Serial No. 328,667, and in Australia January 10, 1928.

This invention relates to the manufacture or lining of pipes by centrifugal action and is more particularly concerned with a method of and means for simultaneously lining a plurality of pipes with concrete, according to which a series of casings for containing pipes or pipe moulds to be lined are arranged in superposed tiers and in frictional contact one with the other. One of the casings is rotated by medium of suitable driving gear, and the drive or rotary motion is transmitted from said casing to the remainder of the series by frictional contact.

In accordance with the invention, the casings may at all times remain in the superposed tier-like arrangement, the pipes or pipe moulds to be lined being inserted lengthwise through open ends of the casings which are provided with means for retaining the pipes concentric therein and causing them to rotate with the casings. The inserted pipes are suitably charged with cementitious material, and trowelling or like smoothing treatment may be effected in the usual manner during rotation of the casings and pipes. After completion of the moulding or lining actions the lined pipes are withdrawn endwise from the casings without disturbing or interfering with the tier-like assemblage of casings.

By the invention a very great saving of time, labor and expense may be effected and the lining of pipes cheapened and expedited.

Referring to the drawings which form part of this specification:—

Figure 1 is an end view of a series of casings arranged in superposed tier-like formation and adapted for forming or lining pipes in accordance with this invention.

Figure 2 is a fragmentary side elevation of the parts seen in Figure 1.

Figure 3 is an enlarged end view of a casing and an associated runner wheel, showing means for retaining a pipe or mould concentrically within the casing and indicating in broken lines a suitable holding down band for preventing vibration of the casing during rotation.

Figure 4 is a longitudinal section of the parts seen in Figure 3.

Figure 5 is a diagrammatic plan view showing a suitable arrangement of two groups of casings and driving means for rotating either group or both groups simultaneously.

In carrying out the invention I may utilize a number of relatively small diameter casings 2 arranged horizontally in side by side formation and adapted to accommodate relatively small pipes 3 to be lined. The casings 2 may comprise hollow shafts of the required dimensions and are assembled at suitably spaced intervals to provide a lower row or tier of the pipe casings. The casings 2 may be supported by anti-friction bearings 4 of the ball, roller or other suitable type, such bearings preferably encircling the casings and being attached to a suitable framework 6.

A driving shaft or casing indicated at 5 extends parallel to the casings 2 at one side of said lower tier and this shaft or casing, which may be connected with any suitable source of power such as an electric motor 8 indicated in Figure 5, is fitted with friction wheels 9 which are adapted to engage and transmit rotary motion to flanged friction rings or wheels 11 carried by an adjacent pipe casing of a second superposed tier of casings indicated at 2a. Each of these casings 2a is fitted with the flanged rings 11 adapted to rest upon and receive rotary motion from the friction wheels 9 of the lower tier 2. In this manner rotary motion may be transmitted to all of the casings in the superposed tiers by frictional contact of the wheels 9 and 11.

An additional tier or tiers of pipe casings 2b may be provided above the intermediate tier 2a and fitted with rings or wheels 11a adapted to rest upon the flanged rings 11 of the adjacent casings of the second or intermediate rod 2a so as to be supported thereby and receive rotary motion therefrom.

The various casings 2, 2a and 2b may be fitted internally at appropriate positions with bush or ring members 12 and associated radial screwed rods 13 as seen in Figure 3, or with appropriate self-centering liners to thereby retain the piping 3 to be lined perfectly straight and in concentric alignment within the casings with which the piping is rotated. Provision may also be made for increasing the length of the casings by employing casing extensions as indicated in broken lines in Figure 5, wherein casing extensions are attached to the friction wheels 9 so that pipes of different lengths may be lined.

In order to counteract any tendency of the intermediate and upper tiers of casings 2a and 2b to jump up and down or vibrate when rotated at high speed I may apply anti-vibration elements 16, in accordance with United States patent application Serial No. 293,335 filed 17th July, 1928, to said intermediate or upper casings 2a, 2b. These anti-vibration elements may consist of arcuate bands or straps 17 which are adapted to extend around the upper arc or portion of the respective casing or an additional flanged ring 18 attached thereto. The bands 17 may be spaced from the rings and provided at desired intervals with bearing pieces 19 which contact with the rings between their side flanges. Any suitable means as indicated at 21 may be provided for retaining the bands in position so that they exercise a steadying influence upon the casings and prevent same from jumping up and down.

If desired the pipe casings and associated parts as before described may be arranged as two distinct groups or sets as seen in Figure 5 and a countershaft 23 with appropriate clutch gear or control means such as fast and loose pulleys 24 provided whereby either group or set may be operated at any particular period. Thus, while the pipes in one group or set are being charged and lined the completed pipes in the other group or set of casings may be removed, thus ensuring economy and convenience in operation.

If desired the lower series of casings indicated at 2 may be substituted by solid shafts which thus serve merely to carry the friction wheels 9 for supporting and imparting rotary motion to the superposed tiers of casings 2a, 2b.

Suitable variable speed mechanism as indicated at 26 may be incorporated in the driving gear and may be arranged in any convenient position and connected to the driving shaft or shafts 5 by any suitable means such as belts 27.

It is to be understood that various modifications, alterations and/or additions may be incorporated in the foregoing without departing from the spirit and scope of the invention as defined by the appended claims.

Having now described my invention what I claim as new and desire to secure by Letters Patent is:—

1. The method of manufacturing or lining pipes by centrifugal action which consists in arranging a series of rotary casings in a plurality of superposed tiers whereby the upper tier or tiers of said casings are supported by and receive rotary motion from the casings of the tier or tiers beneath, inserting the pipes or pipe moulds to be lined with cementitious or plastic material lengthwise within said casings, detachably securing said pipes or moulds concentrically within said casings, rotating the casings of the superposed tiers by frictional contact with adjacent casings or rings thereon, and withdrawing said pipes or moulds from said casings without disturbing the tier arrangement of the latter after the centrifugal moulding operation.

2. Apparatus for the manufacture or lining of pipes by centrifugal action comprising in combination a framework, a lower tier of casings mounted in bearings on said framework and adapted to accommodate a series of pipes or moulds to be lined with cementitious or plastic material, friction wheels or rings carried by said casings, a second tier of casings carrying friction wheels or rings adapted to rest upon and receive rotary motion from the friction wheels of the first named tier and means for detachably retaining the pipes or moulds to be lined within said casings whereby said pipes or moulds may be placed within and removed from the casings without disturbing the tier arrangement of the latter.

3. Apparatus for the manufacture or lining of pipes by centrifugal action comprising in combination a framework, a lower tier of horizontal casings or shafts mounted in bearings on said framework, friction wheels or rings carried by said casings or shafts, a second tier of horizontal casings having friction wheels or rings adapted to rest upon and receive rotary motion from said friction wheels of the first named tier and one or more additional tiers of casings arranged in superposed relation above said second tier whereby a frictional drive is transmitted to the other casings of the superposed tiers.

4. Apparatus for the manufacture or lining of pipes by centrifugal action comprising in combination a framework, a lower tier of rotary pipe casings mounted on said framework, friction wheels or rings carried by said casings, a second tier of casings carrying friction wheels or rings adapted to rest upon and receive rotary motion from the friction wheels of the first named tier and anti-vibration means positively associated with said superposed tiers of casings and adapted to prevent vibratory or jumping movement of the casings in the various tiers.

5. Apparatus for the manufacture or lining of pipes by centrifugal action comprising in combination a framework, a lower tier of rotary pipe casings mounted on said framework, friction wheels or rings carried by said casings, a second tier of casings carrying friction wheels or rings adapted to rest upon and receive rotary motion from the friction wheels of the first named tier, and anti-vibration means consisting of bands or straps extending over the casings of the uppermost tier and adapted to prevent vibratory or jumping movement of the casings in the various tiers.

6. Apparatus for the manufacture or lining of pipes by centrifugal action comprising in combination a framework, a lower tier of rotary casings or shafts mounted in bearings on said framework, friction wheels or rings carried by said casings or shafts, a second tier of casings carrying friction wheels or rings adapted to rest upon and receive rotary motion from the friction wheels of the first named tier, means for detachably retaining the pipes or moulds to be lined with cementitious or plastic material concentrically within said casings and anti-vibration means associated with said superposed tiers of casings, adapted to prevent vibratory or jumping movement of the casings in the various tiers and means for positively securing said anti-vibration means relative to said casings.

7. Apparatus for the manufacture or lining of pipes by centrifugal action comprising in combination a framework, a lower tier of casings mounted in bearings on said framework and adapted to accommodate a series of pipes or moulds to be lined with cementitious or plastic material, friction wheels or rings carried by said casings, a second tier of casings carrying friction wheels or rings adapted to rest upon and receive rotary motion from the friction wheels of the first named tier, means for detachably retaining the pipes or moulds to be lined within said casings whereby said pipes or moulds may be placed within and removed from the casings without disturbing the tier arrangement of the latter, and casing extensions attached to the ends of said casings of one or more of the superposed tiers in axial alignment therewith substantially as and for the purpose specified.

8. Apparatus for the manufacture or lining of pipes by centrifugal action comprising in combination a framework, a lower tier of rotary pipe casings mounted on said framework, friction wheels or rings carried by said casings, a second tier of casings carrying friction wheels or rings adapted to rest upon and receive rotary motion from the friction wheels of the first named tier, anti-vibration means consisting of bands or straps extending over the casings of the uppermost tier and adapted to prevent vibratory or jumping movement of the casings in the various tiers, and centering devices adapted to detachably retain the pipes or moulds to be lined with cementitious or plastic material concentrically within said casings for the purpose specified.

In testimony whereof I affix my signature.

EDWARD SHOTTON HUME.